US 7,705,537 B2

(12) United States Patent
Toyoda et al.

(10) Patent No.: US 7,705,537 B2
(45) Date of Patent: Apr. 27, 2010

(54) PLASMA DISPLAY DEVICE (75) Inventors: Izumi Toyoda, Osaka (JP); Yoshihisa Nagasaki, Osaka (JP); Junichi Hibino, Kyoto (JP); Kazuhiko Sugimoto, Osaka (JP); Keiji Horikawa, Osaka (JP); Nobuyuki Shigetoh, Kyoto (JP); Yuichiro Miyamae, Osaka (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 11/909,682

(22) PCT Filed: Feb. 22, 2007

(86) PCT No.: PCT/JP2007/053291

§ 371 (c)(1),
(2), (4) Date: Sep. 25, 2007

(87) PCT Pub. No.: WO2007/097399

PCT Pub. Date: Aug. 30, 2007

(65) Prior Publication Data

US 2009/0058253 A1    Mar. 5, 2009

(30) Foreign Application Priority Data

Feb. 23, 2006  (JP) .............................. 2006-046571

(51) Int. Cl.
*H01J 17/49* (2006.01)
(52) U.S. Cl. ...................................... 313/582
(58) Field of Classification Search .......... 252/301.6 R, 252/301.4 F; 428/403, 404; 313/582
See application file for complete search history.

(56) References Cited

U.S. PATENT DOCUMENTS 5,289,081 A    2/1994  Tamatani et al.

(Continued)

FOREIGN PATENT DOCUMENTS

EP    1 215 698    6/2002

(Continued)

OTHER PUBLICATIONS

Supplementary European Search Report issued Jul. 9, 2008 in connection with EP 07 71 4789 corresponding to the present U.S. application.

(Continued)

*Primary Examiner*—Joseph L Williams
*Assistant Examiner*—Andrew J Coughlin
(74) *Attorney, Agent, or Firm*—Wenderoth, Lind & Ponack L.L.P.

(57) ABSTRACT

A plasma display device having a panel main body in which a pair of transparent substrates is arranged in opposition so as to form a discharge space between the substrates on at least a front side, barrier ribs are arranged on at least one of the substrates to divide the discharge space into a plurality of spaces, a group of electrodes is arranged on the substrates so as to generate discharge in the discharge space divided with the barrier ribs, and phosphor layers that emit by discharge are provided, in which the phosphor layers are equipped with a green phosphor layer including at least a mixture of $Zn_2SiO_4$:Mn and $(Y, Gd)BO_3$:Tb, the surface of the $Zn_2SiO_4$:Mn is coated with aluminum oxide, and the ratio of the Al element to the Si element on the surface measured with an XPS apparatus is 0.6 to 7.0.

2 Claims, 5 Drawing Sheets

U.S. PATENT DOCUMENTS

| | | | |
|---|---|---|---|
| 6,099,753 | A | 8/2000 | Yoshimura et al. |
| 6,753,645 | B2 | 6/2004 | Haruki et al. |
| 2002/0113552 | A1 | 8/2002 | Juestel et al. |
| 2002/0149311 | A1 | 10/2002 | Justel et al. |
| 2004/0239245 | A1 | 12/2004 | Kawamura et al. |
| 2005/0263742 | A1 | 12/2005 | Nagasaki et al. |
| 2006/0210791 | A1* | 9/2006 | Yoo et al. .................. 428/336 |

FOREIGN PATENT DOCUMENTS

| | | |
|---|---|---|
| EP | 1 383 153 | 1/2004 |
| JP | 5-325901 | 12/1993 |
| JP | 10-195428 | 7/1998 |
| JP | 11-86735 | 3/1999 |
| JP | 2000-149800 | 5/2000 |
| JP | 2001-236893 | 8/2001 |
| JP | 2002-251962 | 9/2002 |
| JP | 2003-183650 | 7/2003 |
| JP | 2006-8989 | 1/2006 |
| KR | 2001-0062387 | 7/2001 |
| WO | 2004/087832 | 10/2004 |

OTHER PUBLICATIONS

International Search Report of Apr. 10, 2007 issued in International Application No. PCT/JP2007/053291.

Thomas Jüstel et al., "Optimization of Luminescent Materials for Plasma Display Panels", Advanced Materials, 2000, 12, No. 7, pp. 527-530.

"Field Emission Display", Jul. 24, 2001 (along with partial English translation).

* cited by examiner

PLASMA DISPLAY DEVICE

This application is a U.S. National Phase Application of PCT International Application PCT/JP2007/053291.

TECHNICAL FIELD

The present invention relates to a plasma display device.

BACKGROUND ART

A plasma display device (below, written as "a PDP device") has attracted attention as an image display device capable of realizing high definition and a large screen in recent years.

A plasma display panel (below, written as "PDP") is a part where the images of the PDP device are displayed, and is configured with a front substrate and a rear substrate. The front substrate is configured with display electrodes consisting of a striped transparent electrode and a metal bus electrode formed on a glass substrate, a dielectric layer covering the display electrodes, and a protective layer. On the other hand, the rear substrate is configured with a striped address electrode formed on the glass substrate, a ground dielectric layer covering the address electrode, barrier ribs formed on the ground dielectric layer, and a phosphor layer formed between each barrier rib.

The front substrate and the rear substrate are sealed by a sealing material formed around their circumference. Then, a discharge gas consisting of neon, xenon, etc. is sealed into a space between the front substrate and the rear substrate created by the sealing.

A PDP with such a configuration performs image display by discharging the discharge gas through a voltage applied to a group of electrodes consisting of the display electrode, a sustain electrode, and a scan electrode, to thus excite the phosphor layers in response to ultraviolet rays generated by discharge.

The PDP performs a full-color display by performing additive color mixture of so-called three primary colors (red, green, and blue). In order to perform this full-color display, the PDP is equipped with phosphor layers that emit in red, green, and blue. The phosphor layer of each color is configured by layering the phosphor material of each color.

A surface of $Zn_2SiO_4$:Mn, which is one of typical green phosphor materials, is charged negatively. Therefore, positive ions of neon and xenon generated in the discharged gas upon the PDP displaying easily cause an ion collision to the negatively charged $Zn_2SiO_4$:Mn. The surface of $Zn_2SiO_4$:Mn deteriorates by this collision. Therefore, when the PDP device is used for a long time, green luminance decreases due to the deterioration of the $Zn_2SiO_4$:Mn.

In order to solve this problem, it is disclosed to layer a film that can make a positive polarity on the surface of $Zn_2SiO_4$:Mn with a vapor deposition method and a firing method (for example, refer to Unexamined Japanese Patent Publication No. H11-86735).

However, because the surface of $Zn_2SiO_4$:Mn is coated with a film substance that does not emit in layering films with the vapor deposition method and the firing method, there is a problem that the luminance of $Zn_2SiO_4$:Mn decreases.

Further, a PDP is proposed in which phosphor particles for PDP coated with a coating film of metal oxide by attaching metal alkoxide on the surface of the phosphor material such as $Zn_2SiO_4$:Mn and firing this are used (for example, refer to Unexamined Japanese Patent Publication No. H10-195428).

However, because the metal alkoxide is a compound containing organic substances, a carbon-based compound remains on the phosphor surface if the firing is not performed sufficiently. This carbon-based compound decomposes by discharge. In particular, the carbon-based compound decomposed with long hours of use is released in the discharge space, and the discharge becomes unstable.

Furthermore, a technique of mixing positively charged (Y, Gd)$BO_3$:Tb having the same green color into negatively charged $Zn_2SiO_4$:Mn has been devised (for example, refer to Unexamined Japanese Patent Publication No. 2001-236893).

However, because there is no change in negative chargeability of the surface of $Zn_2SiO_4$:Mn, the decrease of the luminance of $Zn_2SiO_4$:Mn cannot be suppressed.

SUMMARY OF THE INVENTION

A PDP device of the present invention is a PDP device having a panel main body in which a pair of substrates is arranged in opposition so as to form a discharge space between the substrates, barrier ribs are arranged on at least one of the substrates to divide the discharge space into a plurality of spaces, a group of electrodes is arranged on the substrates so as to generate discharge in the discharge space divided with the barrier ribs, and phosphor layers that emit upon discharge are provided, in which the phosphor layers are equipped with a green phosphor layer consisting of a mixture of $Zn_2SiO_4$: Mn and (Y, Gd)$BO_3$:Tb, the surface of the $Zn_2SiO_4$:Mn is coated with aluminum oxide, and the ratio of a Al element to a Si element on the surface measured with an XPS apparatus is 0.6 to 7.0.

With such a configuration, a PDP device can be realized in which a luminance of a green phosphor material consisting of $Zn_2SiO_4$:Mn is high and decrease of the luminance is small even with long hours of use.

DETAILED DESCRIPTION OF THE INVENTION

Embodiment

Figure 1:
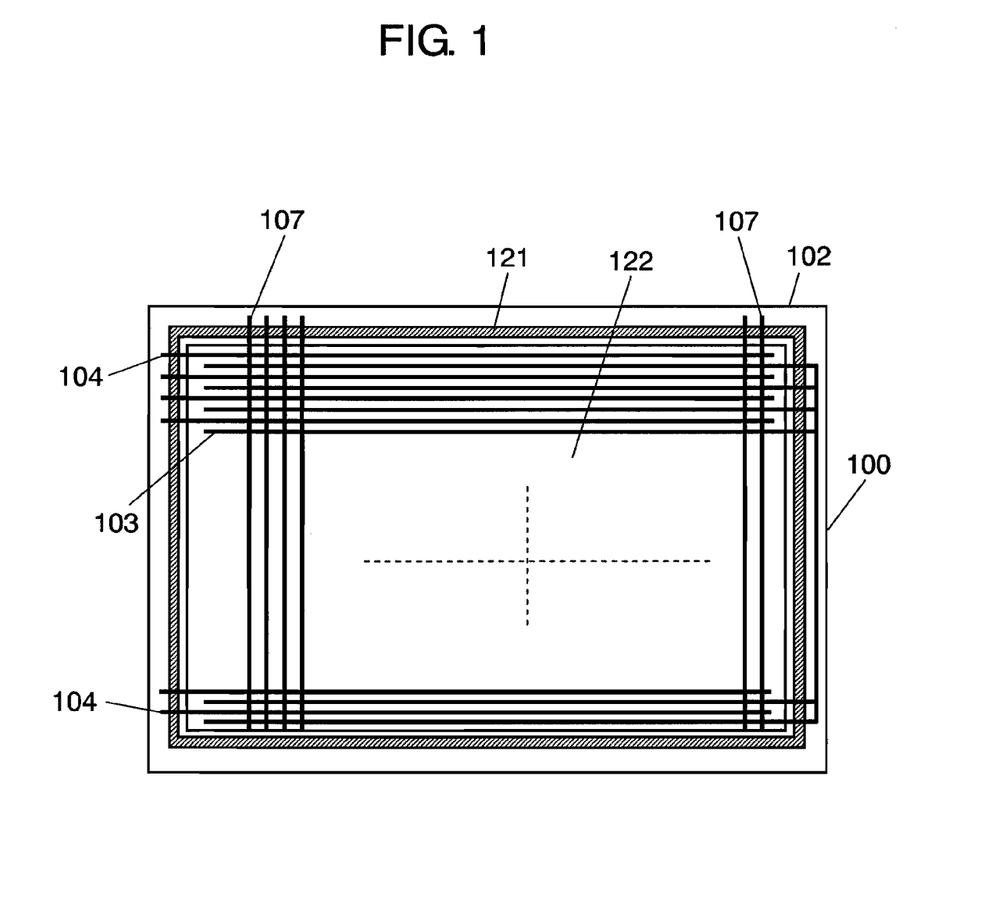
FIG. 1 is a plan view showing a schematic configuration of electrodes of the PDP in an embodiment of the present invention.

FIG. 1 is a plan view showing a schematic configuration of electrodes of the PDP. PDP 100 is equipped with a front glass substrate (not shown in the figure), rear glass substrate 102, sustain electrode 103, scan electrode 104, address electrode 107 and airtight seal layer 121. N of each sustain electrodes 103 and each scan electrodes 104 are arranged in parallel to each other. M of address electrodes 107 are arranged in parallel. Sustain electrode 103, scan electrodes 104, and address electrode 107 have an electrode matrix of a three-electrode structure, and a discharge cell is formed at a crossing point of scan electrode 104 and address electrode 107.

Figure 2:
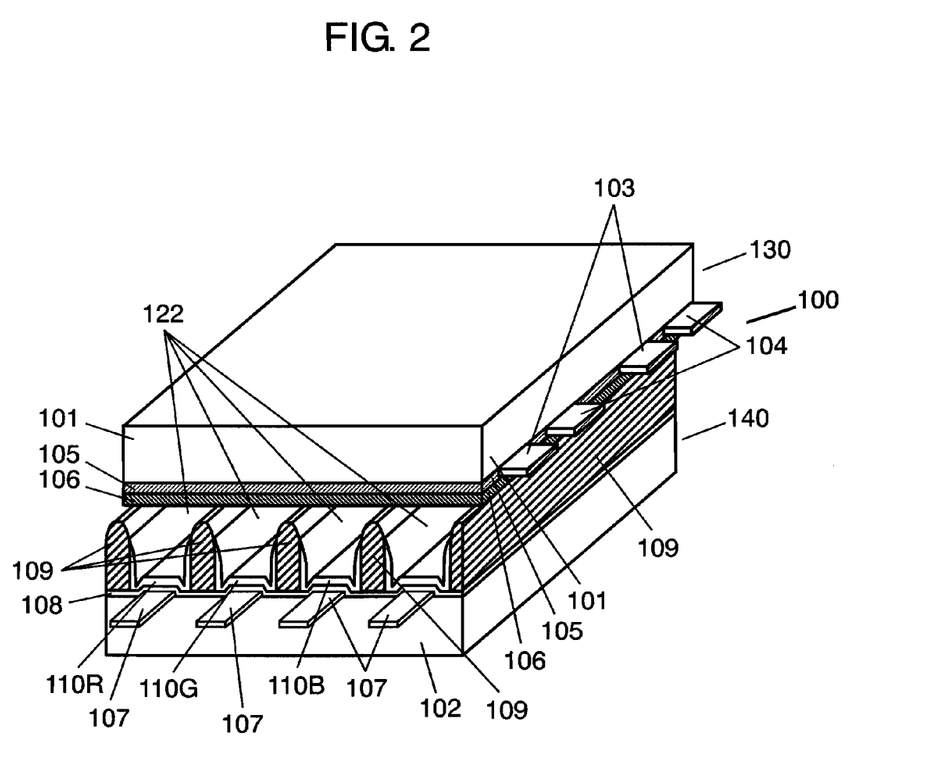
FIG. 2 is a partial cross-section perspective view in an image display region of the PDP in the embodiment of the present invention.

FIG. 2 is a partial cross-section perspective view in an image display region of the PDP. PDP 100 is configured with front panel 130 and rear panel 140. Sustain electrode 103, scan electrode 104, dielectric glass layer 105, and MgO protective layer 106 are formed on front glass substrate 101 of front panel 130. Address electrode 107 ground dielectric glass layer 108, barrier rib 109, and phosphor layers 110R, 110G, and 110B are formed on rear glass substrate 102 of rear panel 140.

PDP 100 is completed by pasting front panel 130 and rear panel 140 together and sealing a discharge gas in discharge space 122 formed between front panel 130 and rear panel 140.

Figure 3:
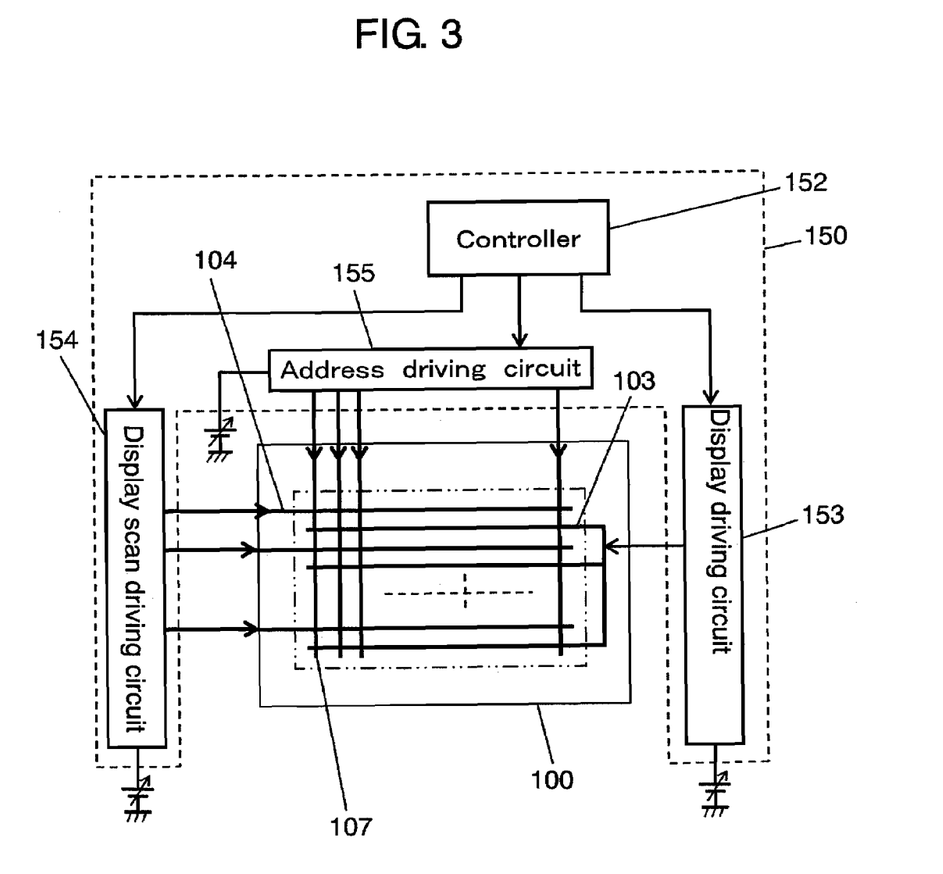
FIG. 3 is a schematic view showing a configuration of the PDP device in the embodiment of the present invention.

FIG. 3 is a schematic view showing a configuration of the PDP device using PDP 100. PDP 100 configures a PDP device by being connected to driving device 150. Display driving circuit 153, display scan driving circuit 154, and address driving circuit 155 are connected to PDP 100. Controller 152 controls a voltage applied to these. An address discharge is performed by applying a prescribed voltage to scan electrode 104 and address electrode 107 corresponding to a discharge cell to be turned on. Controller 152 controls this voltage applied. After that, a sustain discharge is performed by applying a pulse voltage between sustain electrode 103 and scan electrode 104. With this sustain discharge, ultra-violet rays are generated at the discharge cell where the address discharge is performed. The discharge cell is turned on by emitting light from a phosphor layer excited by the ultra-violet rays. An image is displayed by the combination of turning on and turning off each color cell.

Next, a method of manufacturing PDP 100 is explained with reference to FIGS. 1 and 2. First, a method of manufacturing front panel 130 is explained. N of each sustain electrode 103 and scan electrode 104 are formed in a strip on front glass substrate 101. After that, sustain electrode 103 and scan electrode 104 are coated with dielectric glass layer 105. Furthermore, MgO protective layer 106 is formed on a surface of dielectric glass layer 105.

Sustain electrode 103 and scan electrode 104 are formed by firing after being coated with a silver paste with screen printing for an electrode having silver as a main component. Dielectric glass layer 105 is formed by firing after being coated with a paste containing a bismuth oxide-based glass material with screen printing. The paste containing the above-described glass material contains for example 30% by weight of bismuth oxide ($Bi_2O_3$), 28% by weight of zinc oxide (ZnO), 23% by weight of boron oxide ($B_2O_3$), 2.4% by weight of silicon oxide ($SiO_2$), and 2.6% by weight of aluminum oxide. Furthermore, it is formed by mixing 10% by weight of calcium oxide (CaO), 4% by weight of tungsten oxide ($WO_3$), and an organic binder (in which 10% of ethyl cellulose is dissolved into α-terpinenol). Here, the organic binder is that a resin is dissolved into an organic solvent, and an acrylic resin other than ethyl cellulose as a resin and butyl carbitol as an organic solvent can be also used. Furthermore, a dispersion agent (for example, glycertriolate) can be mixed into such an organic binder.

A coating thickness of dielectric glass layer 105 is adjusted so as to be a prescribed thickness (about 40 μm). MgO protective layer 106 consists of magnesium oxide (MgO), and is formed so as to be a prescribed thickness (about 0.5 μm) with a sputtering method and an ion plating method for example.

Next, a method of manufacturing rear panel 140 is explained. M of address electrode 107 are formed in a strip by screen-printing a silver paste for an electrode on rear glass substrate 102 and firing. Ground dielectric glass layer 108 is formed by firing after coating address electrode 107 with a paste containing a bismuth oxide-based glass material with a screen printing method. In the same manner, barrier rib 109 is formed by firing after applying the paste containing a bismuth oxide-based glass material over and over with a fixed pitch with a screen printing method. Discharge space 122 is partitioned with this barrier rib 109, and a discharge cell is formed. The spacing dimension of barrier rib 109 is regulated to about 130 μm to 240 μm adapting to a full HD television of 42 inch to 50 inch and a HD television.

Red phosphor layer 110R, green phosphor layer 110G, and blue phosphor layer 110B are formed in a groove between two adjacent barrier ribs 109. Red phosphor layer 110R consists of a red phosphor material of (Y, Gd) $BO_3$:Eu for example. Blue phosphor layer 110B consists of a blue phosphor material of $BaMgAl_{10}O_{17}$:Eu for example. Green phosphor layer 110G consists of a green phosphor material of $Zn_2SiO_4$:Mn for example.

Front panel 130 and rear panel 140 produced in such a way are layered in opposition so that scan electrode 104 in front panel 130 and address electrode 107 in rear panel 140 lie at a right angle to each other. Glass for sealing is applied on the periphery, and it is fired at about 450° C. for 10 minutes to 20 minutes. As shown in FIG. 1, front panel 130 and rear panel 140 are sealed by forming airtight seal layer 121. Then, PDP 100 is completed by exhausting discharge space 122 to high vacuum once and then sealing a discharge gas (for example, a helium-xenon-based, and a neon-xenon-based inert gas) at a prescribed pressure.

Next, a method of manufacturing a phosphor material of each color is explained. In the present embodiment, the phosphor material manufactured with a solid phase reaction method is used.

$BaMgAl_{10}O_{17}$:Eu, which is a blue phosphor material, is produced with the following method. Barium carbonate ($BaCO_3$), magnesium carbonate ($MgCO_3$), aluminum oxide, and europium oxide ($Eu_2O_3$) are mixed so as to agree with a phosphor composition. It is produced by firing the mixture at 800° C. to 1200° C. in air and further firing at 1200° C. to 1400° C. in a mixed gas atmosphere containing hydrogen and nitrogen.

A red phosphor material (Y, Gd) $BO_3$:Eu is produced with the following method. Yttrium oxide ($Y_2O_3$), gadolinium oxide ($Gd_2O_3$), boric acid ($H_3BO_3$), and europium oxide ($EuO_2$) are mixed so as to agree with the phosphor composition. It is produced by firing the mixture at 600° C. to 800° C. in air and further firing at 1100° C. to 1300° C. in a mixed gas atmosphere containing hydrogen and nitrogen.

Next, a green phosphor material is explained. In the embodiment of the present invention, a mixed body of $Zn_2SiO_4$:Mn and (Y, Gd)$BO_3$:Tb is also used as a green phosphor material. In the mixed body, $Zn_2SiO_4$:Mn, one in which the surface of $Zn_2SiO_4$:Mn whose surface is not coated with a substance (below, written as non-coated $Zn_2SiO_4$:Mn) is coated with aluminum oxide is used. This aluminum oxide is applied so that the ratio of the Al element to the Si element constituting a phosphor material of $Zn_2SiO_4$:Mn (below, written as Al/Si ratio) is controlled to be 0.6 to 7.0 within 10 nm from the outermost surface of $Zn_2SiO_4$:Mn.

Here, the Al/Si ratio can be measured with an XPS apparatus. XPS is an abbreviation of X-ray Photoelectron Spectroscopy, called an x-ray photoelectron spectral analysis, and a method of investigating the state of elements within 10 nm from the outermost surface of a substance. The Al/Si ratio is a value in which the analysis of Al and Si is performed with the XPS apparatus and the ratio of these is taken.

Below, a method of manufacturing the green phosphor material in the embodiment of the present invention is explained in detail. The non-coated $Zn_2SiO_4$:Mn is produced using a conventional solid phase reaction method, liquid phase method, and liquid spraying method. The solid phase reaction method is a producing method by firing oxides or carbonated materials, and flux. The liquid phase method is a producing method by performing hydrolysis of organic metal salts or nitrates in a solution and performing a thermal process on a precursor of the phosphor material generated by adding alkali etc. depending on necessity, and precipitating. Further, the liquid spraying method is a method of producing by spraying a solution containing a raw material of the phosphor material in a heated furnace.

The non-coated $Zn_2SiO_4$:Mn used in the present embodiment is not especially affected by the producing method. However, the producing method with the solid phase reaction method is described here as one example. Zinc oxide, silicon oxide, and manganese dioxide ($MnO_2$) are used as raw materials.

Zinc oxide and silicon oxide, which are raw materials constituting a composition of a mother material of the phosphor material $Zn_2SiO_4$, are mixed. The mixing is performed so that silicon oxide becomes excessive over a stoichiometric ratio, and an excessive amount is 0.1% by mole to 5% by mole. Next, manganese dioxide that becomes a center of the emission is added and mixed at 5% by mole to 20% by mole to $Zn_2SiO_4$:Mn. Moreover, a mixing amount of zinc oxide is appropriately adjusted so that the total amount of zinc oxide and manganese dioxide becomes 200% by mole to $Zn_2SiO_4$:Mn.

Next, this mixture is fired at 600° C. to 900° C. for 2 hours. The non-coated $Zn_2SiO_4$:Mn is produced by milling lightly the fired mixture, performing a sieving, and performing a firing at 1000° C. to 1350° C. in nitrogen or in a mixed atmosphere of nitrogen and oxygen.

Moreover, the reason why silicon oxide is mixed excessively over the stoichiometric ratio is that a negative chargeability of the surface becomes larger by increasing the ratio of silicon oxide, the adhering property increases due to a positive aluminum ion described below, and along with it, an aluminum oxide coat becomes hard. However, when it exceeds 5% by mole, luminance of $Zn_2SiO_4$:Mn becomes low, and when it is less than 0.1% by mole, the effect is not demonstrated. Therefore, the excessive mixing amount of silicon oxide is preferably 0.1% by mole to 5% by mole.

Next, the method of coating the surface of the non-coated $Zn_2SiO_4$:Mn with aluminum oxide is explained. Aluminum nitrate is dissolved into water or an alkali solution at a concentration of 0.4% by weight. A mixed solution is produced by putting the non-coated $Zn_2SiO_4$:Mn in the dissolved solution, and it is stirred while being heated. When the heating temperature is less than 30° C., a metal salt separates in the solution. Further, when the temperature exceeds 60° C., $Zn_2SiO_4$:Mn is dissolved by acid or alkali. Because of this, the heating is performed in the temperature range of 30° C. to 60° C. With this stirring, the coating is performed by adhering the positive aluminum ion in the dissolved solution to the negative chargeable non-coated $Zn_2SiO_4$:Mn. This mixed solution is filtered and dried. After that, by firing this dried substance at 400° C. to 800° C. in air, $Zn_2SiO_4$:Mn in which the surface is coated with aluminum oxide (below, described as an Al-coated $Zn_2SiO_4$:Mn) is produced. The Al/Si ratio of this Al-coated $Zn_2SiO_4$:Mn is 1.4.

Next, a method of producing (Y, Gd)$BO_3$:Tb is described. (Y, Gd)$BO_3$:Tb is produced by mixing $Y_2O_3$, $Gd_2O_3$, $H_3BO_3$, and $Tb_2O_5$ as raw materials so as to achieve the composition of (Y, Gd)$BO_3$:Tb constituting a composition of the mother material of the phosphor, firing at 600° C. to 800° C. in air, and then firing at 1100° C. to 1300° C. in an oxygen-nitrogen atmosphere.

A green phosphor is produced in which (Y, Gd)$BO_3$:Tb produced in such a manner and Al-coated $Zn_2SiO_4$:Mn are mixed at a ratio of 1:1 (below, described as Al-coated mixed green phosphor). Further, a green phosphor is produced in which (Y, Gd)$BO_3$:Tb and non-coated $Zn_2SiO_4$:Mn are mixed at a ratio of 1:1 (below, described as non-coated mixed green phosphor).

Green phosphor layer 110G is formed by layering the above-described Al-coated mixed green phosphor. PDP 100 is produced with rear panel 140 in which (Y, Gd)$BO_3$:Eu is layered for red phosphor layer 110R and $BaMgAl_{10}O_{17}$:Eu for blue phosphor layer 110B. Further, for comparison, PDP 100 formed by layering non-coated mixed green phosphor instead of Al-coated mixed green phosphor is produced in the same manner.

The PDP device is produced by connecting driving device 150 to this PDP 100. In this PDP device, only green phosphor layer 110G is made to emit, and the initial luminance and the luminance sustain ratio after turning on for 1000 hours (below, written as the luminance sustain ratio) are measured. The luminance sustain ratio is obtained as follows. A discharge sustain pulse of a voltage 185V and frequency 100 kHz is applied alternatively to sustain electrode 103 and scan electrode 104 in the PDP device continuously for 1000 hours. Only the green phosphor layer is made to emit in the PDP device after turning on for 1000 hours, and the luminance is measured. The luminance sustain ratio represents the ratio of the luminance after turning on for 1000 hours to the initial luminance.

The initial luminance of the PDP device using the Al-coated mixed green phosphor is 103.0 when the initial luminance of the PDP device using the non-coated mixed green phosphor is 100. Further, the luminance sustain ratio of the PDP device using the Al-coated mixed green phosphor is 97.2 against 94.0 of the PDP device using the non-coated mixed green phosphor.

In such a way, by using a green phosphor in which $Zn_2SiO_4$:Mn is coated with aluminum oxide with the producing method in the present embodiment, the luminance sustain ratio can be improved without generating luminance decrease.

Table 1 shows characteristics of the Al-coated $Zn_2SiO_4$:Mn powder and characteristics of the PDP device by the mixed green phosphor using the same in various producing conditions. Types of aluminum metal salt used for coating and its preparing amount (% by weight) and the firing temperature after coating (° C.) are shown as a producing condition of the Al-coated $Zn_2SiO_4$:Mn. The Al/Si ratio of green phosphor particles is shown as a characteristic of powder. Further, the initial luminance and the luminance sustain ratio of the PDP device produced with green phosphor particles as a characteristic of the PDP device are shown.

TABLE 1

| | Producing conditions of $Zn_2SiO_4$: Mn | | Characteristics of Plasma Display Device | |
|---|---|---|---|---|
| | | | | Luminance |
| No. | Alminum Metal Salt used for coating and its preparing amount(% by weight) | Firing Temprature after coating (° C.) | Characterristics of Powders Al/Si Ratio | Initial Luminance (%) | sustain ratio after turning on for 1000 hours (%) |
| 1 | without coating | | 0.0 | 100.0 | 94.0 |
| 2 | Aluminum nitrate: 0.1 | 400.0 | 0.4 | 104.9 | 95.0 |
| 3 | Aluminum nitrate: 0.2 | 505.0 | 0.6 | 103.8 | 95.5 |
| 4 | Aluminum acetate: 1.0 | 510.0 | 1.2 | 101.9 | 96.7 |
| 5 | Aluminum nitrate: 0.4 | 520.0 | 1.4 | 103.0 | 97.2 |
| 6 | Aluminum nitrate: 0.8 | 550.0 | 2.2 | 100.5 | 98.2 |
| 7 | Aluminum acetate: 2.0 | 600.0 | 2.7 | 98.5 | 98.5 |
| 8 | Aluminum oxalate: 1.0 | 700.0 | 3.1 | 95.5 | 99.2 |
| 9 | Aluminum acetate: 5.0 | 750.0 | 4.1 | 93.2 | 99.0 |
| 10 | Aluminum oxalate: 2.0 | 500.0 | 6.9 | 85.0 | 98.6 |
| 11 | Aluminum oxalate: 4.0 | 600.0 | 10.2 | 75.0 | 98.2 |

The non-coated $Zn_2SiO_4$:Mn produced by the above-described solid phase reaction method is used as the green phosphor particles to be coated. No. 1 is a result of a phosphor of the non-coated $Zn_2SiO_4$:Mn. Nos. 2, 3, 5, and 6 are results of the Al-coated $Zn_2SiO_4$:Mn produced with aluminum nitrate of a preparing amount of 0.1% by weight to 0.8% by weight to the non-coated $Zn_2SiO_4$:Mn. Moreover, the result of the above-described embodiment is shown in No. 5 in Table 1. Further, Nos. 4, 7, and 9 are results of the Al-coated $Zn_2SiO_4$:Mn produced with aluminum acetate of the preparing amount of 1% by weight to 5% by weight. Furthermore, Nos. 8, 10 and 11 are results of the Al-coated $Zn_2SiO_4$:Mn produced with aluminum oxalate of the preparing concentration of 1% by weight to 4% by weight. In any of the cases, the coating can be performed with the same method as the above-described producing method.

Figure 4:
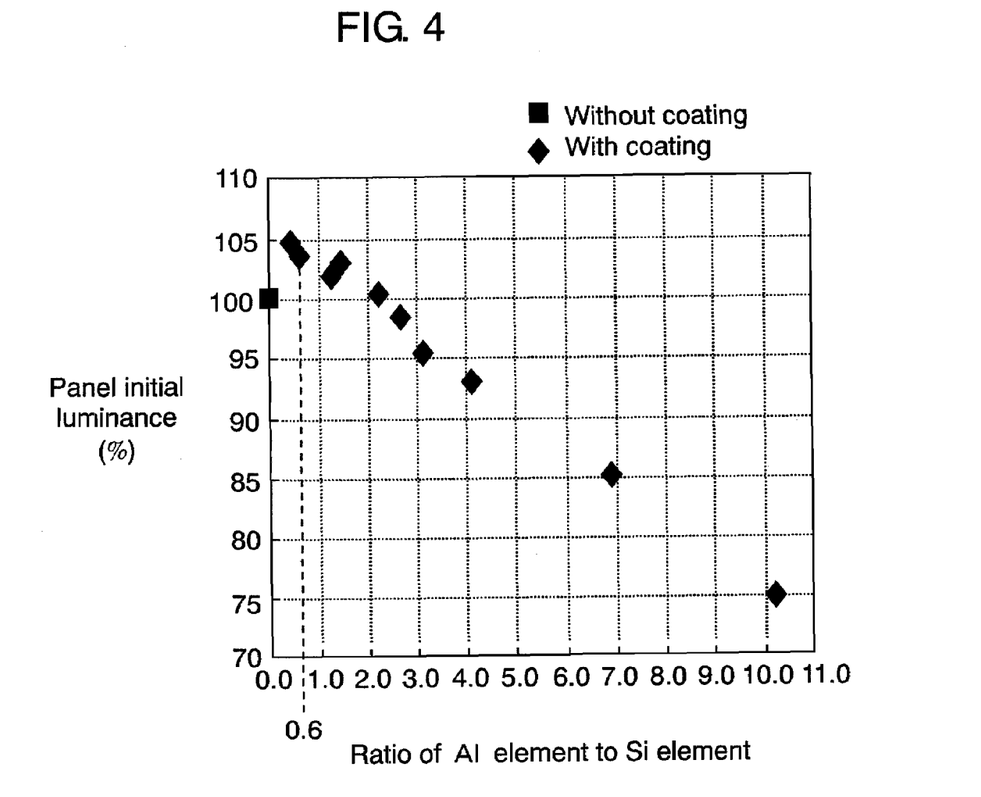
FIG. 4 is a characteristic chart showing the relationship between the initial luminance and the Al/Si ratio of the PDP device in the embodiment of the present invention.

FIG. 4 is a characteristic chart showing the relationship between the initial luminance and the Al/Si ratio of the Al-coated $Zn_2SiO_4$:Mn of the PDP device. As shown in FIG. 4, the initial luminance can be increased compared to the case of the non-coated $Zn_2SiO_4$:Mn where the Al/Si ratio is in the range of 0.6 to 2.0. However, the initial luminance decreases with the Al/Si ratio exceeding 2.0. When the Al/Si ratio is 7.0 or less, the decrease of the initial luminance is about 15% and there is practically no problem.

Figure 5:
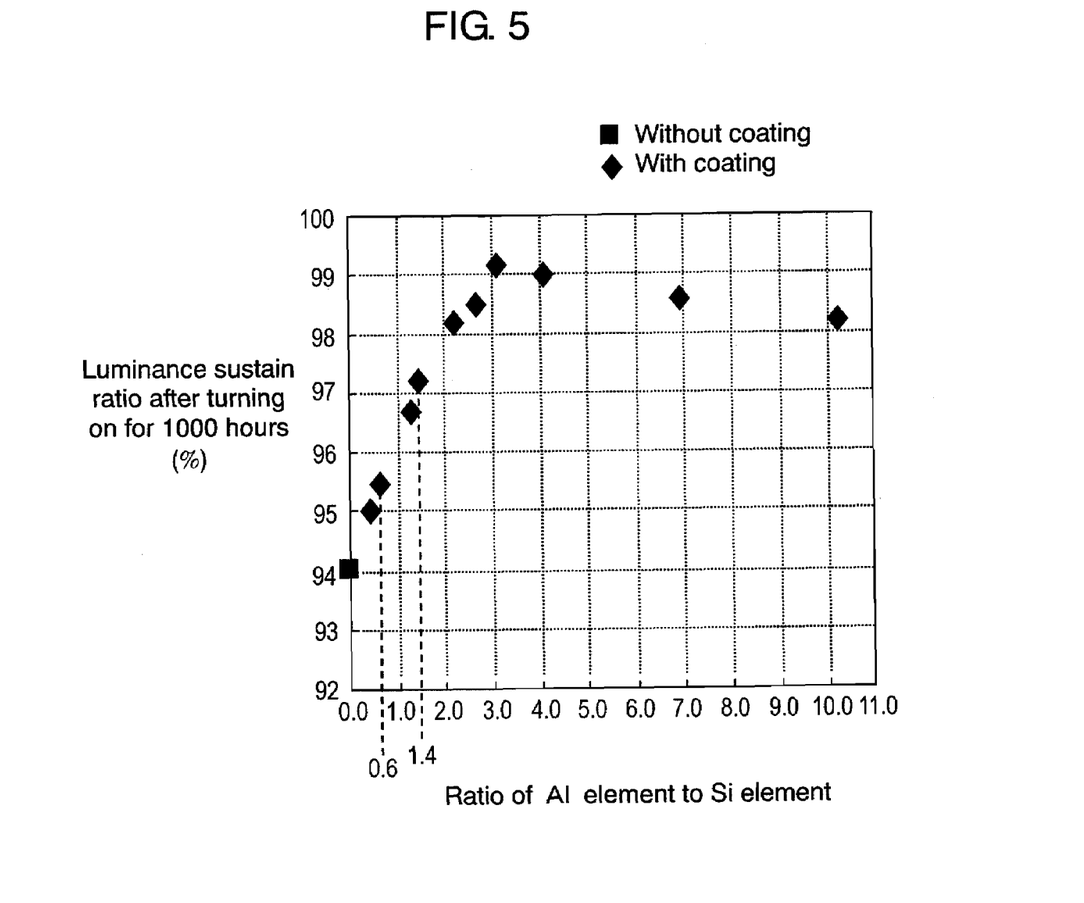
FIG. 5 is a characteristic chart showing the relationship between the luminance sustain ratio and the Al/Si ratio of the PDP device of the embodiment in the present invention.

FIG. 5 is a characteristic chart showing the relationship between the luminance sustain ratio and the Al/Si ratio of the PDP device. As shown in FIG. 5, without relating to the type of the metal salt used in the coating, when the Al/Si ratio is 0.6 or more, the luminance sustain ratio after turning on for 1000 hours improves compared to the case of using the non-coated $Zn_2SiO_4$:Mn. In particular, when the Al/Si ratio is 1.4 or more, the luminance sustain ratio improves largely. Further, in any of the cases, a change cannot be observed at all in the stability of discharge of the PDP device after turning on for 1000 hours.

Therefore, the Al/Si ratio of the aluminum oxide coating to $Zn_2SiO_4$: Mn is desirably 0.6 to 7.0 because the luminance has practically no problem and the luminance sustain ratio is improved. Further, the Al/Si ratio is more desirably 1.4 to 2.0 because the initial luminance is high and the luminance sustain ratio can be improved largely.

With a conventionally known vapor deposition method and firing method, by performing a finer or thicker coating with Al, an emitting part on the phosphor surface is covered up with the coating substance, and the luminance decreases. This is considered to be because the coating with Al is performed over entire particles. Contrary to that, because silicon is detected within 10 nm from the outermost surface by measurement with the XPS apparatus in the manufacturing method in the present invention, at least a part of the surface is coated without coating the entire particles. Therefore, the decrease of the luminance is suppressed. Besides, the improvement of the chargeability is performed even partially coated, and a sufficient effect is achieved to suppress the deterioration of the luminance.

Moreover, because an organic substance such as metal alkoxide is not used, there is no cause of unstabilizing the discharge in the inside of the PDP, and the discharge stability does not change also over long hours of use.

In the present embodiment, a green phosphor is used in which (Y, Gd)$BO_3$:Tb and Al-coated $Zn_2SiO_4$:Mn are mixed at a ratio of 1:1. When the mixing ratio is other than 1:1, the effect of the Al-coated $Zn_2SiO_4$:Mn is achieved depending on the mixing ratio, and its effect is not limited to the mixing ratio.

The present invention can realize a PDP device with a small deterioration of luminance against a discharge for a long period, and is useful in a display device of a big screen.

The invention claimed is:
1. A plasma display device comprising:
a pair of substrates confronting each other so as to form a discharge space between the pair of substrates;
a barrier rib arranged on at least one of the pair of substrates to divide the discharge space into a plurality of spaces;
a group of electrodes arranged on the pair of substrates so as to generate discharge in the discharge space divided with the barrier rib; and
a panel main body with a phosphor layer configured to emit light by discharge,
wherein the phosphor layer has a green phosphor layer including phosphor particles of at least $Zn_2SiO_4$:Mn, a surface of each of the phosphor particles of at least $Zn_2SiO_4$:Mn is partially coated with aluminum oxide, and the ratio of Al element to Si element measured within 10 nm from an outermost surface of the phosphor particle of at least $Zn_2SiO_4$:Mn measured using an XPS apparatus is 0.4 to 2.2.
2. The plasma display device according to claim 1, wherein the green phosphor layer includes phosphor particles of (Y, Gd) $Bo_3$:Tb.

* * * * *